(12) United States Patent
Kazmi et al.

(10) Patent No.: US 7,729,718 B2
(45) Date of Patent: Jun. 1, 2010

(54) OUTER LOOP POWER CONTROL FOR F-DPCH

(75) Inventors: Muhammad Ali Kazmi, Bromma (SE); Dirk Gerstenberger, Kista (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 428 days.

(21) Appl. No.: 11/815,195

(22) PCT Filed: Jun. 7, 2005

(86) PCT No.: PCT/EP2005/052608

§ 371 (c)(1),
(2), (4) Date: Jul. 31, 2007

(87) PCT Pub. No.: WO2006/081875

PCT Pub. Date: Aug. 10, 2006

(65) Prior Publication Data

US 2008/0153494 A1    Jun. 26, 2008

(30) Foreign Application Priority Data

Feb. 1, 2005    (SE) ................................ 0500240-7

(51) Int. Cl.
*H04B 7/00* (2006.01)
*H04Q 7/20* (2006.01)

(52) U.S. Cl. ...................... 455/522; 455/67.11; 455/69; 455/442; 370/252; 370/332; 370/318

(58) Field of Classification Search ................. 455/522, 455/63.1, 501, 69, 442, 450, 453, 67.11, 455/436–444, 507, 509, 511, 515, 517, 11.1; 370/331–335, 320, 345, 318, 252, 328, 329, 370/341
See application file for complete search history.

(56) References Cited

U.S. PATENT DOCUMENTS

| | | | |
|---|---|---|---|
| 2002/0082038 A1* | 6/2002 | Mochizuki .................. 455/522 |
| 2004/0166884 A1* | 8/2004 | Oh et al. ..................... 455/522 |
| 2006/0246907 A1* | 11/2006 | Kaikkonen et al. .......... 455/442 |
| 2006/0262754 A1* | 11/2006 | Andersson et al. .......... 370/332 |
| 2007/0191053 A1* | 8/2007 | Suzuki ....................... 455/522 |
| 2007/0287382 A1* | 12/2007 | Catreux-Erceg et al. ... 455/63.1 |
| 2009/0086682 A1* | 4/2009 | Kazmi et al. ................ 370/335 |

OTHER PUBLICATIONS

3GPP TR 25.899 V6.1.0 (Sep. 2004) "3rd Generation Partnership Project: Technical Specification Group Radio Access Network; High Speed Download Packet Access (HSDPA) enhancements (Release 6)" Sep. 2004; XP002345458.
3GPP TSG RAN Meeting #26; "Dirk Gerstenberger; Report from TSG RAN WG1 Chairman to TSG Ran #26"; Dec. 10, 2004; pp. 1-15; XP002345459.
3GPP TSG RAN WG1 Archives, Vol Dec. 2004; XP002345460.

* cited by examiner

*Primary Examiner*—Sujatha Sharma

(57) ABSTRACT

A method and arrangement are described herein for power control for the F-DPCH (Fractional-Dedicated Physical Control Channel) for a 3rd generation mobile telecommunication system applying HSDPA, in particular for a user equipment in soft handover.

4 Claims, No Drawings

OUTER LOOP POWER CONTROL FOR F-DPCH

FIELD OF THE INVENTION

The present invention relates to a method and arrangement for power control of the F-DPCH (Fractional-Dedicated Physical Control Channel) in a $3^{rd}$ generation mobile telecommunication system, in particular advantageous for user equipments in soft handover.

BACKGROUND AND SUMMARY OF THE INVENTION

The present invention relates to $3^{rd}$ generation mobile telecommunication systems including High Speed Downlink Packet Access (HSDPA), as specified, e.g., in the documents 3GPP TR 25.848 "Physical Layer Aspects of UTRA High Speed Downlink Packet Access" or 3GPP TR 25.899 "High Speed Downlink Packet Access (HSDPA) enhancements" both issued by the $3^{rd}$ Generation Partnership Project. In HSDPA every user is allocated a dedicated channel (DPCH) in both directions to exchange higher layer signaling information between user equipments (UE) and Radio Network Controller (RNC). As there can be a large number of HSDPA users in a cell, this might lead to a waste of the OVSF (Orthogonal Variable Spreading Factor)-codes in the downlink. In order to save such OVSF-codes the concept of Fractional Dedicated Physical Channels (F-DPCH) has been introduced, e.g. in said document 3GPP TR25.899. Several HSDPA users are to share the same F-DPCH on which only dedicated pilots and TPC-commands are transmitted, i.e. the DPCCH (TPC and pilot bits) of several users are time multiplexed on one OVSF-code. The corresponding SRBs (Signalling Radio Bearers) are mapped onto HSDPA leading to a more efficient usage of the channelisation codes.

The F-DPCH, however, does not contain any transport channel, which implies that the outer loop power control cannot be based on the transport block errors. One solution to this problem could be that the user equipment derives the SIR (Signal-to-Interference Ratio) target for the inner loop power control based on the uplink TPC Bit Error Ratio (UL TPC BER) (UL TPC commands are transmitted on the downlink). This is applicable for a single link case. However, in soft handover the user equipment may not experience the same UL BER on different radio links and, thus, it is not specified how a user equipment in soft handover derives the SIR target for the inner loop.

The user equipment may set its SIR target in a way that all radio links are able to maintain the TPC BER below or equal to the target TPC BER that is set by the network. This means that the user equipment derives its SIR target for the inner loop based on the worst link, i.e. the link having the highest TPC BER.

DESCRIPTION OF THE INVENTION

A normal DPCH has one or more transport channels comprising transport blocks, which in turn are used to run the outer loop power control based on block error indication using CRC parity bits attached to each transport block. This type of outer loop adjusts the SIR target for the inner loop power control. Regular SIR target adjustment is required to maintain the target quality despite variations in the propagation conditions. In soft handover the user equipment soft combines the received data (transport blocks) before evaluating whether the transport block is erroneous or not.

However, in case of F-DPCH there is no data transmitted, so the TPC BER is used to adjust the SIR target.

The network sets the target TPC BER. In the user equipment it is the role of the outer loop to maintain the target TPC BER ($R_t$). There are different ways to adjust SIR target. One simple way is to use a fix SIR target setting; however, it may be difficult to adjust correct SIR target in dynamic propagation environment. A SIR target that is too low and depending upon the fading conditions leads to unreliable detection of UL TPC commands sent on the downlink, which, if these commands are not discarded by the UE, can lead to a transmit power rush or transmit power drop in the terminal, resulting in excessive uplink interference or dropped calls. Similarly, a too high SIR target will waste downlink power.

It is therefore important to adjust the SIR target in a more dynamic way as discussed below:

Initially, the user equipment maps the target TPC BER ($R_t$) to the SIR target. This could be done, e.g., by using either pre-simulated mapping tables (TPC BER versus SIR) for different speeds/environments or from a mathematical relation, which describes a function of propagation related parameters, e.g., speed or delay spread. The SIR target is used by the user equipment to run the inner loop for downlink power control.

The user equipment estimates the SIR every time slot and finds the corresponding TPC BER (R) using the mapping tables as stated above.

Then the user equipment compares the estimated TPC BER and the target TPC BER and adjusts the $SIR_t$ such that the target TPC BER is achieved. How accurately the user equipment adjusts the $SIR_t$ depends on how accurately the user equipment can relate the SIR to the TPC BER in varying propagation conditions.

Finally, the user equipment generates the TPC command for the downlink inner loop power control according to the adjusted SIR target and sends this command on the uplink.

In soft handover there is only one SIR target, which is estimated after soft combining of the pilot symbols from all the radio links in the active set. However, TPC commands from different radio link sets should not be soft combined, as it cannot be assumed that they are the same. When assuming that the network sets the same TPC BER target for all the radio links, the actual TPC BER that is measured by the user equipment on different radio links can be different due to different radio propagation conditions. Let $R_1, R_2, \ldots, R_N$ denote the measured TPC BER on the different radio links, having reliable TPC commands, i.e. a bit error ratio that is below a certain appropriate threshold, e.g. below 30% as specified in section 8.7.2 of the document 3GPP TS25.101 "UE radio transmission and reception (FDD)". The user equipment can derive the bit error ratio R to adjust the $SIR_t$ from these reliable TPC commands by help of the equation $$R = f(R_1, R_2, \Lambda, R_N).$$

The function above denotes a generalized expression. A more specific function, which can be regarded an appropriate example of $f$ to derive the bit error ratio R is the max weighted function as given by the expression $$R = \max(a_1 R_1, a_2 R_2, \Lambda, a_N R_N).$$

$a_1, a_2, \ldots, a_N$ denote parameter values that can be used to apply different weights to the TPC commands from the different radio links. According to a preferred embodiment of the present invention the required quality target is met on the HS-DSCH serving radio link, which is a special case of the above expression and is obtained for the following values of $a_N$:

$$a_N = \begin{cases} 1, & N = 1 \\ 0, & N \neq 1 \end{cases}$$

Hence, $R=R_1$, where $R_1$ is the TPC error rate on the serving HS-DSCH radio link.

When assuming that all parameters $a_i$ are set to a value 1, i.e. there is no extra weighting of any of the links, the max function can be simplified to the expression $$R = \max(R_1, R_2, \Lambda, R_N).$$

The user equipment then uses R to adjust the $SIR_t$ using a similar procedure as already described above. This algorithm will ensure that the required TPC error rate is maintained on all the links. In other words, in soft handover the $SIR_t$ setting/adjustment is based on the worst radio link in terms of TPC BER, thereby ensuring that reliable downlink quality is maintained on all radio links.

The soft handover rule described above does not take into account the reliability of the TPC commands. As a special case the rule set above is applied only on the reliable TPC commands, i.e. the UE derives a BER R' to adjust the SIR target from the reliable TPC commands. In other words, the principles stated in the formulas above are applicable except that only reliable TPC commands are considered. Those TPC commands are reliable whose BER is below, e.g., said 30% as specified in section 8.7.2 of the document 3GPP TS25.101 "UE radio transmission and reception (FDD)". This will ensure that the downlink quality is maintained on all the reliable radio links.

In soft handover radio links may have different TPC BERs; therefore the present invention defines a mandatory behaviour of the user equipments by specifying the selection of the TPC BER for the purpose of a $SIR_t$ adjustment. Thereby, the present invention ensures that the TPC commands that are received from all radio links in soft handover are within a desired range, i.e. the TPC BER target is achieved on all radio links. The method according to the present invention thus ensures that all the 'reliable' TPC commands received from all the radio links in soft handover are within the desired range.

The invention claimed is:

1. A method in a user equipment of a telecommunication network applying high speed downlink packet access, HSDPA, said method for performing outer loop power control of a downlink channel from a base station and dedicated to said user equipment, characterised by maintaining a required bit error ratio (BER) for the TPC-commands of the serving base station by adjusting the target of the signal-to-interference ratio (SIR) in the user equipment to a new target value using a maximum function of a weighted set of the estimated bit error ratios of the individually received TPC-commands for radio links of said user equipment.

2. The method according to claim 1, whereby the base station supports a high-speed downlink shared channel, HS-DSCH, and all except for one of the weights of said weighted set are equal to zero.

3. The method according to claim 1, whereby said TPC-commands are reliable TPC-commands.

4. An arrangement in a user equipment of a telecommunication network applying high speed downlink packet access, HSDPA, said arrangement for performing outer loop power control of a downlink channel from a base station and dedicated to said user equipment, characterised in means for maintaining a required bit error ratio (BER) for the TPC-commands of the serving base station comprising means for adjusting the target of the signal-to-interference ratio (SIR) in the user equipment to a new target value using a maximum function of a weighted set of the estimated bit error ratios of the individually received TPC-commands for radio links of said user equipment.

* * * * *